United States Patent [19]
Erickson et al.

[11] 3,847,627
[45] Nov. 12, 1974

[54] GLASS COMPOSITIONS, FIBERS AND METHODS OF MAKING SAME

[75] Inventors: Thomas D. Erickson, Newark; Warren W. Wolf, Reynoldsburg, both of Ohio

[73] Assignee: Owens-Corning Fiberglas Corporation, Toledo, Ohio

[22] Filed: Mar. 19, 1973

[21] Appl. No.: 340,982

Related U.S. Application Data

[63] Continuation-in-part of Ser. No. 298,702, Oct. 18, 1972.

[52] U.S. Cl................................. 106/50, 106/52
[51] Int. Cl........................................... C03c 13/00
[58] Field of Search............ 106/50, 52; 65/12, 134

[56] References Cited
UNITED STATES PATENTS

| | | | |
|---|---|---|---|
| 3,673,049 | 6/1972 | Giffen et al...................... | 106/52 X |
| 2,920,971 | 1/1960 | Stookey............................ | 106/52 X |
| 3,540,893 | 4/1970 | Pettigrew......................... | 106/52 X |
| 2,908,036 | 10/1959 | Russell............................. | 65/12 |
| 3,753,674 | 8/1973 | Ohlberg............................ | 65/134 |
| 3,783,092 | 1/1974 | Majumdar......................... | 106/50 |

FOREIGN PATENTS OR APPLICATIONS

| | | | |
|---|---|---|---|
| 124,553 | 6/1947 | Australia............................. | 106/50 |
| 217,609 | 7/1968 | U.S.S.R.............................. | 106/50 |
| 141,273 | 1/1961 | U.S.S.R.............................. | 106/50 |
| 259,337 | 4/1970 | U.S.S.R.............................. | 106/50 |
| 1,160,535 | 8/1969 | Great Britain..................... | 106/50 |
| 1,209,244 | 10/1970 | Great Britain..................... | 106/50 |

*Primary Examiner*—Helen M. McCarthy
*Attorney, Agent, or Firm*—Carl G. Staelin; John W. Overman; Raymond E. Scott

[57] ABSTRACT

This disclosure relates to fiberizable glass compositions, fibers and the method of making textile fibers which are boron and fluorine free. Boron and fluorine have now been recognized as potential pollutants in the manufacture of fiberizable glasses and glass fibers and the following disclosure eliminates these pollutants by substituting $TiO_2$, MgO and ZnO in the basic three component glass composition of $SiO_2$, $Al_2O_3$ and CaO. The preferred glass composition consists essentially of, by weight, 54.5 to 60% $SiO_2$, 9 to 14.5% $Al_2O_3$, 17 to 24% CaO, 2 to 4% $TiO_2$, 1.5 to 4% MgO and 1 to 5.5% RO, wherein RO is an oxide selected from the group consisting of ZnO, SrO and BaO, calculated as ZnO.

8 Claims, No Drawings

GLASS COMPOSITIONS, FIBERS AND METHODS OF MAKING SAME

This application is a continuation-in-part of our co-pending application Ser. No. 298,702, filed Oct. 18, 1972 which application is a continuation-in-part of Ser. No. 248,360, filed April 28, 1972, abandoned. This application also discloses an improvement over our copending applications for U.S. Pat., Ser. Nos. 340,983, and 340,985.

BACKGROUND OF THE INVENTION

Fiberizable glass compositions presently include boron or fluorine containing compounds as fluxing agents which reduce the viscosity of the batch particularly during the early stages of melting. After recognition of boron and fluorine as potential pollutants, the problem has been to produce a glass composition (1) having the requisite physical properties for fiberization, (2) which is acceptable to the industry, and (3) which does not include fluorine and boron.

For example, E glass, which is the most common glass composition presently used for making textile fibers, has 9 to 11 percent by weight $B_2O_3$ and may contain fluorine as a fluxing agent. An important object of the present invention is to provide a substitute for E glass, while eliminating boron and fluorine. The specifications for E glass fibers also require that the percentage of alkali metal oxides, namely $Na_2O$, $K_2O$ and $Li_2O$, be less than 1 percent, by weight. Therefore, it is important to maintain the alkali metal oxide level of glass compositions at one percent, or less. This is particularly so when developing new glass compositions which may be used in place of E glass or others having one precent by weight or less of alkali metal oxides, calculated as $Na_2O$. The composition of E glass is disclosed in U.S. Pat. No. 2,334,961, assigned to the assignee of the instant application.

Boron is commonly supplied in the batch composition as colemanite, anhydrous boric acid or boric acid, while fluorine is added as $CaF_2$ or sodium silicofluoride ($Na_2SiF_6$). Melting of the glass batch raw materials in gas-fired furnaces, for example, to form molten glass from which fibers may be drawn and formed includes heating the batch and molten glass to temperatures in excess of 2,200° F. Commonly used textile fibers are melted in the range of 2,400° to 2,750° F. At these melting temperatures, $B_2O_3$ and $F_2$, or various compounds of boron and fluorine, tend to volatilize out of the molten glass and the gases can be drawn up the exhaust stacks and escape into the atmosphere surrounding the glass fiber forming area.

The resultant air and possible water pollution can be reduced or eliminated by a number of approaches. Water scrubbing or filtering of exhaust gases can often clean up exhaust air. Use of electric furnaces in place of gas-fired furnaces will virtually eliminate the losses of volatile fluxes (e.g., boron and fluorine) commonly associated with gas-fired furnaces at temperatures above 2,200° F. These clean-up approaches however are often costly and can be avoided if the source of the pollutants can be removed from the glass compositions. Complicating this solution, however, is the fact that removing boron and fluorine removes two commonly used fluxing ingredients in fiberizable, textile glass compositions. Maintaining acceptable melting rates, melting and operating temperatures, liquidus and viscosity in the absence of boron and fluorine has been found to be quite difficult.

An acceptable operating range in a commercial textile glass feeder or bushing is between 2,250° and 2,500° F. A glass composition that will operate smoothly in this environment preferably should have a liquidus temperature of approximately 2,200° F. or less and a viscosity of log 2.5 poises at 2,400° F., or less.

The fiber forming temperature is preferably about 100° F. greater than the liquidus temperature to avoid devitrification (crystal growth) in the glass as the fibers are formed. Since devitrification causes irregularities or seeds in the glass, which hamper or may stop fiber production, the liquidus temperature of a commercial textile glass should preferably be less than about 2,200° F.

The viscosity of the glass is also a key to efficient and economical fiber forming. Glass viscosities of log 2.50 poises at 2,450° F., or more, require such high temperatures to melt the glass and make it flowable and formable into fibers that the metallic bushings or feeders may sag and become unusable or must be replaced or repaired more frequently than bushings contacting less viscous glasses.

In our above referenced copending applications, we have disclosed the substitution of $TiO_2$ and MgO for boron and fluorine in a $SiO_2$, $Al_2O_3$ and CaO glass composition. It was first discovered that the addition of 3 to 6% by weight $TiO_2$ to the three phase glass composition reduced the viscosity of the molten glass to within the fiberization range. The liquidus temperature was still somewhat high for conventional fiberization equipment and techniques, although glass fibers can be successfully made for the four component composition. Another problem with the four component glass composition, in certain applications, was the yellow or brown color of the fibers formed from the molten glass. The color results from the relatively high concentration of $TiO_2$ when $Fe_2O_3$ is present. Iron oxide ($Fe_2O_3$) is normally present in trace amounts from the raw materials.

The addition of 1.5 to 4 percent by weight MgO lowered the liquidus temperature to within the fiberization range of conventional commercial fiber forming equipment and reduced the required $TiO_2$ concentration to improve the color of the fibers formed from the glass. The preferred range of $TiO_2$ in the five component glass is 3 to 5 percent, by weight. The color is still somewhat yellow, especially where the $TiO_2$ concentration exceeds 4 percent, and the liquidus temperature and viscosity are still somewhat higher than the preferred range of E glass, for example.

It is therefore an object of the present invention to provide a boron and fluorine free glass composition which may be readily substituted for E glass, for example, and which has the preferred properties of E glass, including color, modulus of elasticity and tensile strength. With these problems in mind, the boron and fluorine free, fiberizable glass compositions and methods of this invention were developed.

SUMMARY OF THE INVENTION

The fiberizable glass composition of this invention is boron and fluorine free and consists essentially of, by weight, 54.5 to 60% $SiO_2$, 9 to 14.5% $Al_2O_3$, 17 to 24% CaO, 2 to 4% $TiO_2$, 1.5 to 4% MgO and 1 to 5.5% RO, wherein RO is an oxide selected from the group consisting of ZnO, SrO and BaO, calculated as ZnO. Small additions of $Li_2O$, up to 0.3%, and $Cr_2O_3$ may also be added to improve the physical properties of the glass composition.

It will be understood that any glass composition will contain impurities which are added to the batch with the raw materials. For example, iron as $Fe_2O_3$ will be present in trace amounts up to one percent in the sand used as a raw material. The presence of $Fe_2O_3$ is important because it combines with $TiO_2$ to form a yellow or brown color in the resultant fiber which may create a problem in certain applications. MgO, $Na_2O$, $K_2O$ and $Li_2O$ would also normally be present in trace amounts, less than one percent, from the raw materials.

The addition of $TiO_2$, particularly as a substitute for $B_2O_3$ and $F_2$, to the basic three component glass composition lowers the viscosity of the glass to within the fiberization range, however the liquidus temperature still may be somewhat high, as described above. Titania ($TiO_2$) is marketed as a fine white powder, finding extensive use in paints to give opacity to enamels and the like. It is also used in glass decoration, however the use of $TiO_2$ as a substitute for $B_2O_3$ and $F_2$ to lower the viscosity of fiberizable glasses was quite unexpected.

MgO may be added to the glass composition by the raw materials and has been known to have an affect upon the melting temperature, as described in the above referenced United States patent which discloses the composition of E glass. The MgO is however substituted primarily for CaO in the five component glass and therefore the concentration of $TiO_2$ is still somewhat high, resulting in a discoloration of the glass fibers formed from the composition. Further the liquidus temperature and viscosity of the five component glass composition are still somewhat above the preferred ranges for E glass.

It has now been discovered that ZnO, SrO and BaO may be substituted for some of the $TiO_2$ in the five component glass composition to improve or eliminate the discoloration of the fibers and the addition of these oxides further lowers the liquidus temperature and viscosity. The six component glass composition of this invention then provides a full substitute for E glass, without the potential pollutants boron and fluorine.

The affect of ZnO, SrO and BaO to lower the liquidus temperature and reduce the required concentration of $TiO_2$ in the six component glass composition of this invention was not expected from the teaching of the prior art and is considered to be an important advancement in the production of fiberizable boron and fluorine free glass compositions.

The preferred composition of the fiberizable glass composition of this invention also has less than one percent by weight of the alkali metal oxides, calculated as $Na_2O$. Further, the disclosed composition has a viscosity within the fiberization range of log 2.5 poises at 2,450° F. or less and a liquidus temperature of about 2,200° F., or less. Glass compositions falling within the above range can be drawn into fine, continuous fibers having a diameter of about $15 \times 10^{-5}$ to $55 \times 10^{-5}$ inches.

DESCRIPTION OF THE INVENTION

The fiberizable, six component glass composition and method of this invention eliminates the potential pollutants boron and fluorine and the problems encountered with the four and five component glass compositions described in our above referenced copending applications. The color of the fibers formed from the improved six component glass composition compares favorably with E glass, for example, and the physical properties, including the liquidus temperature and viscosity, are within the preferred ranges for fiberization. The preferred range of viscosity for the molten glass composition is log 2.5 poises at 2,500° F., or less, and the glass composition preferably has a liquidus temperature of 2,200° F., or less.

The fiberizable, boron and fluorine free glass composition of this invention consists essentially of, by weight, 54.5 to 60% $SiO_2$, 9 to 14.5% $Al_2O_3$, 17 to 24% CaO, 2 to 4% $TiO_2$, 1.5 to 4% MgO and 1 to 5.5% RO, wherein RO is an oxide selected from the group consisting of ZnO, SrO and BaO, calculated as ZnO. The preferred concentrations of SrO and BaO in the six component glass composition are calculated as the equivalent of ZnO, in weight percent. As described above, the preferred composition includes less than one percent, by weight, of the alkali metal oxides, specifically $Na_2O$, $K_2O$, and $Li_2O$, total, calculated as $Na_2O$. The method of making a boron and fluorine free textile glass fiber then includes melting the six component glass composition of this invention to obtain a molten glass having a viscosity of log 2.5 poises at 2,450° F., or less, and a liquidus temperature of about 2,200° F., reducing the temperature of the molten glass to within the fiberization range and drawing a fiber. The methods of fiberizing glass are described in the prior art patents, including U.S. Pat. No. 2,908,036, assigned to the assignee of the instant application.

The glass composition will also include certain impurities, as described above, in trace amounts up to one percent by weight, including $Fe_2O_3$, $Na_2O$, $K_2O$ and $Li_2O$, although $Li_2O$ may be added in amounts up to 0.3%, by weight, to lower the liquidus temperature and serve as a fluxing agent, as shown by the following examples.

Specific compositions embodying the principals of this invention are described in the following Table 1, examples 1 to 24.

TABLE 1

| Ingredient | Example No. 1 (% by weight) | No. 2 | No. 3 | No. 4 | No. 5 | No. 6 | No. 7 | No. 8 | No. 9 | No. 10 |
|---|---|---|---|---|---|---|---|---|---|---|
| $SiO_2$ | 57.9 | 58.9 | 57.8 | 57.8 | 57.3 | 58 | 58.3 | 57.3 | 58.6 | 57.4 |
| $Al_2O_3$ | 11.4 | 11.0 | 12 | 12.3 | 11.7 | 11.9 | 10.9 | 11.9 | 11 | 12 |
| CaO | 21.8 | 21.4 | 21.1 | 21.6 | 21.2 | 21.7 | 21.9 | 19.2 | 22 | 18.9 |
| MgO | 2.6 | 2.6 | 3.2 | 2.5 | 2.7 | 2.5 | 2.7 | 3.2 | 2.7 | 3.2 |
| BaO | — | — | — | — | 3.8 | — | — | — | — | — |
| SrO | 3.4 | — | — | — | — | — | — | — | — | — |
| ZnO | — | 2.7 | 1.3 | 2.6 | — | 2.6 | 2.8 | 3.9 | 2.8 | 3.9 |
| $Na_2O$ | 0.7 | 1 | 0.6 | 1.0 | 0.8 | 1.0 | 1.0 | 0.6 | 0.6 | 0.6 |
| $K_2O$ | — | — | 0.05 | — | — | — | — | 0.05 | — | 0.1 |
| $Li_2O$ | — | — | — | — | — | — | — | — | — | 0.1 |
| $TiO_2$ | 2.2 | 2.2 | 3.7 | 2.2 | 2.4 | 2.1 | 2.2 | 3.7 | 2.2 | 3.7 |
| $Fe_2O_3$ | — | 0.1 | 0.2 | 0.2 | — | 0.1 | — | 0.2 | 0.2 | 0.2 |
| Liquidus: Temp., °F. | 2175 | 2165 | 2150 | 2155 | 2170* | 2145 | 2160* | 2145 | 2155 | 2160 |
| Viscosity: Temp., °F. at log poises | | | | | | | | | | |

TABLE 1—Continued

| Ingredient | Example No. 1 (% by weight) | No. 2 | No. 3 | No. 4 | No. 5 | No. 6 | No. 7 | No. 8 | No. 9 | No. 10 |
|---|---|---|---|---|---|---|---|---|---|---|
| 2.0 | 2594 | 2616 | 2590 | 2601 | 2616 | 2603 | 2577 | 2610 | 2590 | — |
| 2.5 | 2406 | 2412 | 2400 | 2408 | 2423 | 2409 | 2391 | 2408 | 2403 | — |
| 2.75 | 2328 | 2333 | 2320 | 2330 | 2345 | 2331 | 2314 | 2328 | 2325 | — |
| 3.0 | 2256 | 2262 | 2250 | 2258 | 2275 | 2264 | 2242 | 2255 | 2255 | — |

| Ingredient | Example No. 11 (% by weight) | No. 12 | No. 13 | No. 14 | No. 15 | No. 16 | No. 17 | No. 18 | No. 19 | No. 20 |
|---|---|---|---|---|---|---|---|---|---|---|
| $SiO_2$ | 57.1 | 57.7 | 57.7 | 58.3 | 58.2 | 57.8 | 58.5 | 57.3 | 58.1 | 57.6 |
| $Al_2O_3$ | 11.9 | 11.14 | 11.17 | 11.6 | 11.6 | 11.5 | 11.6 | 12.2 | 11.5 | 11.4 |
| CaO | 18.2 | 22.9 | 21.4 | 21.8 | 21.7 | 21.6 | 21.8 | 21.7 | 21.7 | 21.5 |
| MgO | 3.2 | 2.8 | 2.8 | 2.0 | 2.0 | 2.0 | 2.0 | 1.8 | 2.0 | 2.0 |
| BaO | — | — | 3.9 | — | — | — | — | — | — | — |
| SrO | — | — | — | — | — | — | — | — | — | — |
| ZnO | 5.2 | 2.8 | — | 2.9 | 2.9 | 3.9 | 2.0 | 2.7 | 2.9 | 3.9 |
| $Na_2O$ | 0.7 | — | — | 1.0 | 1.0 | 1.0 | 0.5 | 0.9 | 1.0 | 1.0 |
| $K_2O$ | 0.1 | — | — | — | — | — | — | — | — | — |
| $Li_2O$ | — | — | — | — | — | — | 0.2 | — | — | — |
| $TiO_2$ | 3.6 | 2.3 | 2.4 | 2.3 | 2.5 | 2.3 | 2.3 | 3.3 | 2.8 | 2.5 |
| $Fe_2O_3$ | 0.2 | 0.1 | 0.1 | 0.1 | 0.1 | 0.1 | 0.1 | 0.1 | 0.13 | 0.13 |
| Liquidus: Temp., °F. | 2135 | 2165 | 2155 | 2125 | 2125 | 2110 | 2105 | 2100 | 2130 | 2105 |
| Viscosity: Temp., °F. at Log Poise | | | | | | | | | | |
| 2.0 | | 2580 | 2623 | 2643 | 2604 | 2600 | 2605 | 2620 | 2600 | 2585 |
| 2.5 | — | 2389 | 2433 | 2445 | 2410 | 2408 | 2404 | 2420 | 2400 | 2393 |
| 2.75 | — | 2311 | 2358 | 2362 | 2323 | 2322 | 2332 | 2337 | 2320 | 2318 |
| 3.0 | — | — | 2282 | 2288 | 2247 | 2255 | 2261 | 2265 | 2255 | 2243 |

| Ingredient | Example No. 21 (% by weight) | No. 22 | No. 23 | No. 24 |
|---|---|---|---|---|
| $SiO_2$ | 57.9 | 54.6 | 56.2 | 57.0 |
| $Al_2O_3$ | 11.5 | 11.3 | 11.7 | 11.1 |
| CaO | 21.3 | 17.4 | 17.9 | 20.5 |
| MgO | 2.0 | 3.1 | 3.2 | 3.6 |
| BaO | — | 9.3 | — | — |
| SrO | — | — | 6.5 | — |
| ZnO | 3.9 | — | — | 2.7 |
| $Na_2O$ | 0.48 | 0.8 | 0.8 | 0.7 |
| $K_2O$ | 0.02 | — | — | — |
| $Li_2O$ | 0.23 | — | — | — |
| $TiO_2$ | 2.3 | 3.4 | 3.5 | 2.2 |
| $Fe_2O_3$ | 0.13 | 0.13 | 0.13 | 0.21 |
| | | | | 2.0 ($ZrO_2$) |
| Liquidus: Temp., °F. | 2105 | 2175 | 2180 | 2230 |
| Viscosity: Temp., °F. At Log Poise | | | | |
| 2.0 | 2586 | — | 2590 | 2625 |
| 2.5 | 2392 | 2413 | 2403 | 2360 |
| 2.75 | 2314 | 2332 | 2325 | 2292 |
| 3.0 | 2249 | 2266 | 2251 | 2242 |

The viscosity determinations in Examples 1 through 24 were obtained using the apparatus and procedure described in U.S. Pat. No. 3,056,283 and in the article in *The Journal of the American Ceramic Society*, Vol. 42, No. 11, November, 1959, pages 537–541. The article is entitled "Improved Apparatus for Rapid Measurement of Viscosity of Glass at High Temperatures" by Ralph L. Tiede. Other specific viscosity determinations referred to herein also would be measured by the apparatus and procedures in the Tiede article.

The glass compositions of this invention, some of which are described in Table 1, Examples 1 through 24, have a liquidus temperature of 2,200° F., or less and a viscosity of log poise 2.50 (i.e., $10^{2.50}$ poises) at 2,450° F. or less. These glasses are therefore suitable for fiber forming and direct replacement of E glass and similar textile glass fiber forming glasses containing boron and fluorine with boron and fluorine free glasses is therefore possible.

All of the glass compositions in Table 1 contain one percent by weight or less of the alkali metal oxides, as described above and thus these glasses in fiber form will be acceptable to consumers requiring low levels of the alkali metal oxides. The primary glass forming ingredients in the glass compositions of this invention are $SiO_2$ and $Al_2O_3$. The basic three oxides of the glass composition are $SiO_2$, $Al_2O_3$ and CaO.

$TiO_2$ (titania) is used in the glass composition of this invention as a flux in place of boron and fluorine. The titania, as described above, reduces the viscosity in these compositions without adversely affecting the liquidus temperature. $TiO_2$ should be used in these compositions in amounts of 4 percent, by weight, or less, preferably less than 3.5 percent. Concentrations of titania above about 6 percent causes the liquidus temperature to reach undesirable levels. Further, concentrations of $TiO_2$ above 4 percent also causes a brownish or yellowish coloration to the glass fibers. This can be a problem where the fibers are combined with a clear matrix material and are visible in the final product. Clear plastic panels or clear plastic fishing rods are examples of products that might be less desirable if tinted fibers are utilized. The concentration of MgO in the six component glass is less than 4 percent, by weight. Concentrations of MgO above 4 percent increases the liquidus temperature above the preferred limit for fiberization.

Zinc oxide (ZnO) is normally produced by direct oxidation of the metal and subsequently purified by sublimation. It is produced in a number of grades based on color, particle size and smoothness of texture. The use of ZnO in glass compositions was limited due to its refractory nature and its tendency to increase the melting temperature of the glass. Barium oxide (BaO) is usually furnished by the compound barium carbonate ($BaCo_3$), although it occurs naturally as the mineral witherite which is seldom pure enough for use in glass manufacture. The preferred glass composition may also include 0.5 to 2 percent by weight $ZrO_2$ to improve the chemical durability of fibers formed from the glass composition of this invention.

The alkali metal oxides ($Li_2O$, $Na_2O$ and $K_2O$) are used in some compositions to control the viscosity. $K_2O$ can be utilized by itself in amounts up to 1 percent by weight. $Na_2O$ can be used by itself in amounts up to 1 percent by weight, or it can be utilized in combination with $Li_2O$ or $K_2O$. When $Na_2O$ and $K_2O$ are combined, they should be used in amounts that, when calculated as $Na_2O$, will total less than 1 percent, by weight. When $Na_2O$ is used with the maximum of 0.3 percent by weight $Li_2O$, the $Na_2O$ should be used in amounts of 0.2 percent, or less, in order to keep the total alkali metal oxide (calculated as $Na_2O$) level at or below 1 percent by weight.

As described above, $Fe_2O_3$ may be included within the disclosed glass composition as an impurity of the batch raw materials or it may be added intentionally in amounts up to one percent by weight. $Fe_2O_3$ can, however, discolor the galss and fibers drawn from the glass, particularly in combination with $TiO_2$ and the concentration of $Fe_2O_3$ should therefore be kept as low as possible when clear glass fibers are required for the end use. In product applications where clear glass fibers are required, the concentration of $Fe_2O_3$ should be maintained at 0.5 percent by weight, or less, and preferably below 0.2 percent, by weight.

Various other impurities or tramp materials may be present in the glass compositions in amounts of about 0.3 percent or less by weight, without adversely affecting the glasses or fibers. These impurities will include chromic oxide ($Cr_2O_3$), oxides of vanadium, sulfates and phosphates. These impurities can enter the glass as raw material impurities or can be products formed by the chemical reaction of the molten glass with the furnace components.

Modifications and variations within the scope of the appended claims are intended to be included.

We claim:

1. A boron and fluorine free fiberizable glass composition having a liquidus temperature of 2,200° F. or less and having a viscosity of log 2.5 poises at 2,450° F. or less and having less than the equivalent of 1 weight percent, total, of $Na_2O$, $K_2O$ and $Li_2O$, calculated as $Na_2O$, consisting essentially by weight of 54.5 to 60% $SiO_2$, 9 to 14.5% $Al_2O_3$, 17 to 24% CaO, 2 to 3.5% $TiO_2$, 1.5 to 4% MgO and 1 to 6% RO, wherein R is selected from the group consisting of Zn, Sr and Ba, and the amount of RO is calculated as ZnO.

2. A boron and fluorine free fiberizable glass composition, having a liquidus temperature of 2,200° F, or less and having a viscosity of log 2.5 poises at 2,450° F. or less and having less than the equivalent of 1 weight percent, total, of $Na_2O$, $K_2O$ and $Li_2O$, calculated as $Na_2O$, consisting essentially of, by weight, 54.5 to 60% $SiO_2$, 9 to 14.5% $Al_2O_3$, 17 to 24% CaO, 2 to 4% $TiO_2$, 1.5 to 4% MgO and 1 to 6% RO, wherein RO is an oxide selected from the group consisting of ZnO, SrO and BaO, calculated as ZnO.

3. The method of making a boron and fluorine free textile glass fiber, comprising the steps of melting a glass batch consisting essentially of, by weight, 54.5 to 60% $SiO_2$, 9 to 14% $Al_2O_3$, 17 to 24% CaO, 2 to 4% $TiO_2$, 1.5 to 4% MgO and 1 to 6 percent of the oxide RO, wherein RO is selected from the group consisting of ZnO, SrO and BaO, calculated as ZnO in molecular weight percent, reducing the temperature of the molten glass to within the fiberization range having a liquidus temperature of 2,200° F. or less and having a viscosity of log 2.5 poises at 2,450° F. or less and drawing a fiber.

4. The method of making a glass fiber defined in claim 3, wherein the glass batch has a liquidus temperature of 2,200° F. or less and a viscosity of log 2.5 poises at 2,450° F. or less, including melting of the glass batch by heating the batch to a temperature of about 2,400° to 2,750° F., above the melting temperature of the batch, and lowering the temperature of the molten glass to a temperature of from about 2,250° to 2,500° F., within the fiberization range of the molten glass.

5. A boron and fluorine free textile glass fiber having less than one percent, by weight, total alkali metal oxides, calculated as $Na_2O$, consisting essentially of:

| Component | Percent By Weight |
|---|---|
| $SiO_2$ | 54.5 to 60 |
| $Al_2O_3$ | 9 to 14.5 |
| CaO | 17 to 24 |
| $TiO_2$ | 2 to 4 |
| MgO | 1.5 to 4 |
| RO | 1 to 5.5 |
| $Na_2O$ | 0 to 1 |
| $K_2O$ | 0 to 1 |
| $Li_2O$ | 0 to .3 |
| $Fe_2O_3$ | 0 to 1 | wherein RO is an oxide selected from the group consisting of ZnO, SrO and BaO, and the concentration of RO is calculated as ZnO and having a liquidus temperature of 2,200° F. or less and a viscosity of log 2.5 poises at 2,450° F. or less.

6. The boron and fluorine free textile glass fiber defined in claim 5, having a concentration of $TiO_2$ of less than 3.5 percent by weight.

7. A fiberizable, boron and fluorine free glass composition, which includes less than 1 percent, by weight, of $Na_2O$, $K_2O$ and $Li_2O$, total, calculated as $Na_2O$, consisting essentially of, by weight:

| Component | Percent By Weight |
|---|---|
| $SiO_2$ | 54.5 to 60 |
| $Al_2O_3$ | 9 to 14.5 |
| CaO | 17 to 24 |
| $TiO_2$ | 2 to 4 |
| MgO | 1.5 to 4 |
| RO | 1 to 5.5 |
| $Na_2O$ | 0 to 1 |
| $K_2O$ | 0 to 1 |
| $Li_2O$ | 0 to .3 |
| $Fe_2O_3$ | 0 to 1, | wherein RO is an oxide selected from the group consisting of ZnO, SrO and BaO, and the concentration of RO is calculated as ZnO and having a liquidus temperature of 2,200° F. or less and a viscosity of log 2.5 poises at 2,450° F. or less.

8. The fiberizable, boron and fluorine free glass composition defined in claim 7, wherein said composition includes 0.5 to 2 percent by weight $ZrO_2$ to improve the chemical durability of fibers formed from the glass.

* * * * *